(12) United States Patent
Lanni

(10) Patent No.: US 7,420,823 B2
(45) Date of Patent: Sep. 2, 2008

(54) POWER FACTOR CORRECTION CONTROL CIRCUIT

(75) Inventor: Thomas W Lanni, Laguna Niguel, CA (US)

(73) Assignee: Comarco Wireless Technologies, Inc, Lake Forest, CA (US)

( * ) Notice: Subject to any disclaimer, the term of this patent is extended or adjusted under 35 U.S.C. 154(b) by 0 days.

(21) Appl. No.: 11/897,208

(22) Filed: Aug. 29, 2007

(65) Prior Publication Data

US 2007/0296380 A1    Dec. 27, 2007

Related U.S. Application Data

(62) Division of application No. 10/800,269, filed on Mar. 12, 2004, now Pat. No. 7,279,868.

(51) Int. Cl.
*H02M 3/335* (2006.01)

(52) U.S. Cl. .......................................... 363/16; 363/20

(58) Field of Classification Search ................... 363/16, 363/20, 21.01, 21.02, 21.04, 21.06, 34
See application file for complete search history.

(56) References Cited

U.S. PATENT DOCUMENTS

| 4,412,277 | A |   | 10/1983 | Mitchell et al. ............... 363/81 |
| 4,510,401 | A | * | 4/1985  | Legoult ........................ 307/66 |
| 5,642,267 | A |   | 6/1997  | Brkovic et al. ................. 363/19 |
| 6,411,535 | B1 |  | 6/2002  | Roux .......................... 363/124 |
| 6,420,935 | B1 |  | 7/2002  | Harris et al. ................. 330/295 |
| 7,019,474 | B2 | * | 3/2006 | Rice et al. ...................... 363/17 |
| 2002/0145407 | A1 | | 10/2002 | Chang ........................ 323/235 |

FOREIGN PATENT DOCUMENTS

EP          1 198 058        4/2002

OTHER PUBLICATIONS

Souza et al., "High Power Factor Rectifier with Reduced Conduction and Commutation Losses," Jun. 6, 1999, Intelec '99, 21ST International Telecommunications Energy Conference, Copenhagen, Jun. 6-9, 1999, ISBN: 0-7803-5625-X.
European Search Report for Corresponding European Patent Application (Patent Application No. 05250639.1), dated Oct. 19, 2005.

* cited by examiner

*Primary Examiner*—Jessica Han
(74) *Attorney, Agent, or Firm*—Pillsbury Winthrop Shaw Pittman LLP

(57) ABSTRACT

A bi-directional boost circuit for power factor correction includes a power factor control circuit and a pair of diodes, a pair of inductors, and a pair of switches. A first diode, a second diode, a first inductor, a second inductor, a first switch, and a second switch convert the AC input voltage, rectify the AC input voltage, and output an intermediate DC voltage. The power factor control circuit receives the AC input voltage and receives the intermediate DC voltage. The power factor control circuit regulates the DC output voltage. Based on the AC input voltage and the intermediate DC output voltage, the power factor control circuit controls an inductor current waveform by driving the first switch and the second switch to create a substantially sinusoidal current as seen by the power source that is in phase with the AC input voltage.

17 Claims, 11 Drawing Sheets

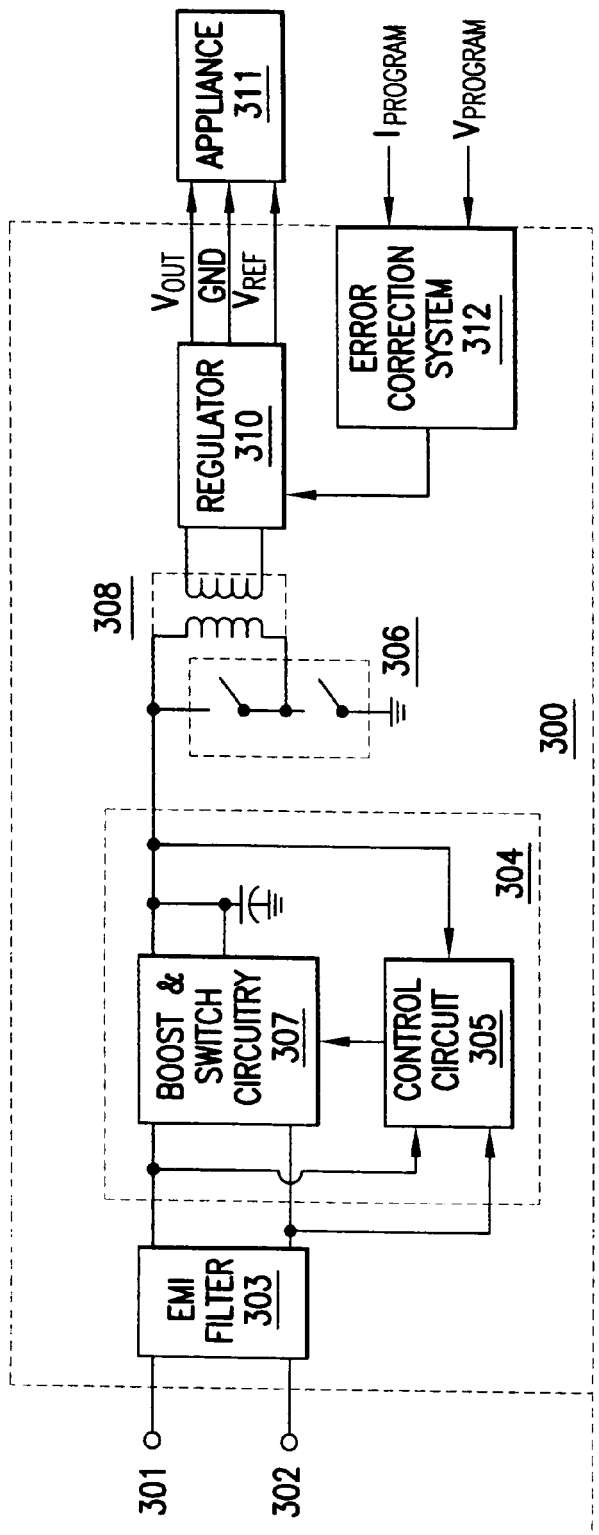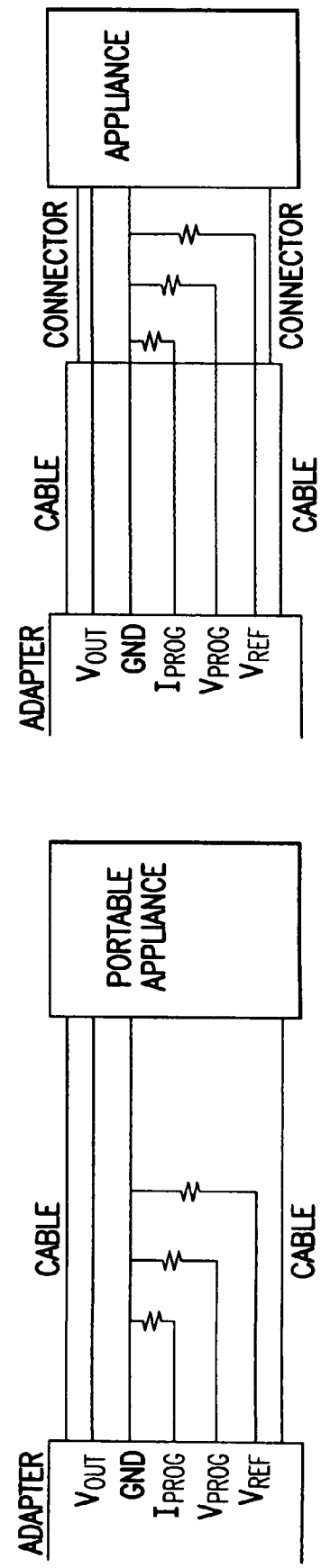
FIG.3(a)
FIG.3(b)
FIG.3(c)

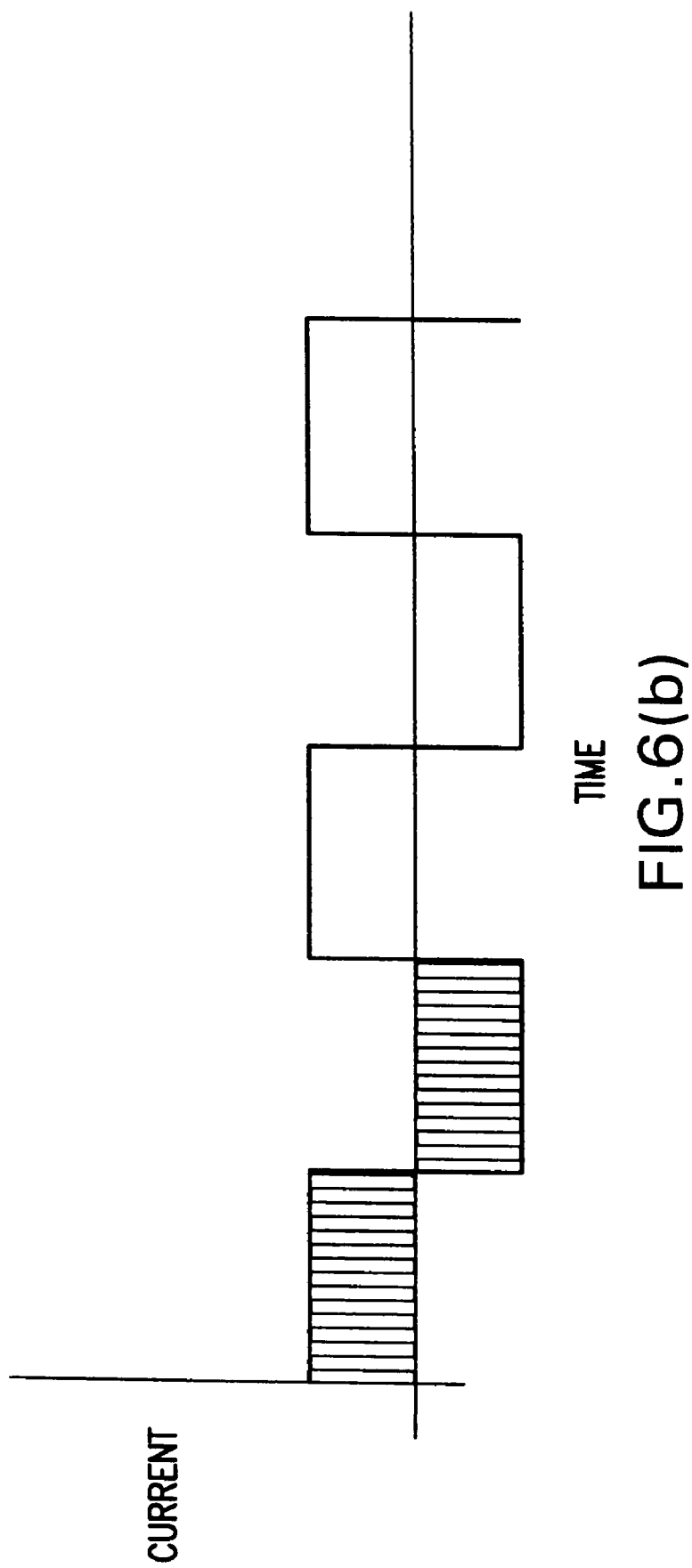

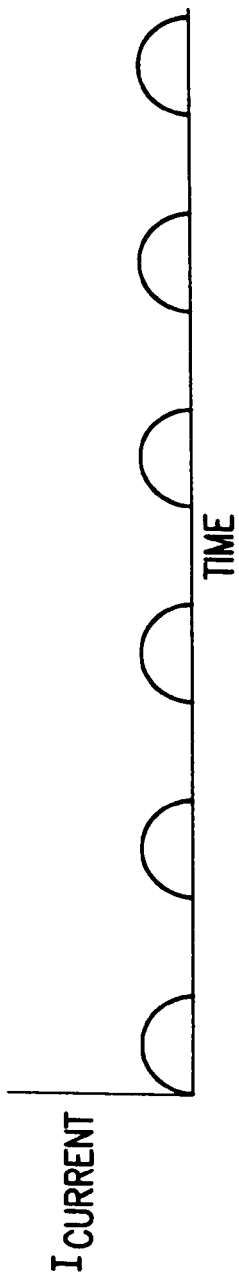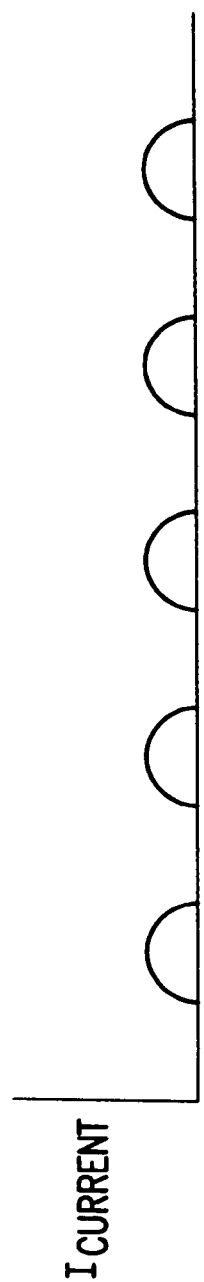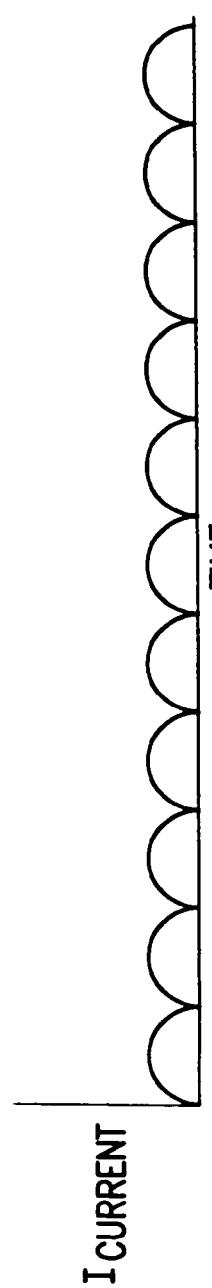

POWER FACTOR CORRECTION CONTROL CIRCUIT

RELATED APPLICATION

This application is a divisional application of U.S. patent application Ser. No. 10/800,269, filed Mar. 12, 2004, now U.S. Pat. No. 7,279,868.

BACKGROUND OF THE INVENTION

1. Technical Field

This invention relates to power adapters, and more specifically, to a system and method to correct power factor, i.e., the ratio of real power to apparent power.

2. Description of the Related Arts

The explosive growth in consumer electronics is causing the electricity supply industry considerable concern. The appliances or consumer electronics devices employ power supplies that draw current from the AC power line during the peak of the sine wave. Most of the appliances or consumer electronics device utilize a rectifier-bridge/smoothing capacitor circuit.

Power factor is the ratio of real power to apparent power. In the United States, power is provided at approximately 120 Volts AC with a frequency of approximately 60 Hertz. In Europe and other areas, power is provided at approximately 240 Volts AC with a frequency of approximately 50 Hertz. In order to provide a maximum amount of usable energy or power, it is desirable for a load to draw current as if the load is entirely resistive. If the load appears resistive, then the current drawn from the source may have a substantially sinusoidal shape, as the AC voltage has, and the current drawn from the source may be in phase with the AC input voltage.

Power supplies that utilize rectifier-bridge/smoothing capacitor circuits draw non-sinusoidal currents as the AC line's instantaneous voltage exceeds the storage capacitor's voltage. The electricity generator, with no power factor correction, must supply energy at the top/peak of the sine wave rather than throughout the cycle, which can cause the sine wave to collapse around its peak.

The electricity generator sees the phase lag between the current and voltage, together with the harmonics from peaky loads, as combining to provide require rms currents, which in turn reduces the real power that the network can supply. Varying loads at the consumer end of the line produces fluctuations throughout the local line and these fluctuations cause undersirable consequences, such as causing lighting sources to flicker.

FIG. 1 illustrates the current and voltage waveforms for an electronic device that power factor correction (PFC) is designed to correct according to the prior art. As illustrated, the voltage waveform is sinusoidal in shape and the current waveform can be characterized as a waveform with a steady current value with large spikes in the amplitude of the current waveform along with a high content of harmonics. The large spikes in the current waveform are caused because of the switching power supplies' use of the rectifier bridge/smoothing capacitor circuits. From an efficiency viewpoint, a typical uncorrected switched-mode power supply has a power factor of 0.6, which effectively reduces the current available from the AC socket from about 13 to about 7.8 Amps.

A solution for power factor correction is to condition the equipment's input load power so that it appears purely resistive using active PFC techniques. Common PFC designs employ a boost preconverter ahead of the conventional voltage-regulation stage, which effectively cascades to switched-mode power supplies. The boost preconverter raises the full-wave rectified, unfiltered AC line to a DC input rail at a level slightly above the rectified AC line, which is typically around 375 to 400 volts DC. By drawing current throughout the AC line cycle, the boost preconverter forces the load to draw current in phase with AC line voltage, quashing harmonic emissions.

FIG. 2 illustrates a power factor correction circuit with a boost preconverter according to the prior art. The full-wave bridge rectifier 200 receives the AC input voltage and produces a full-wave rectified voltage. The boost preconverter 205 receives the full-wave rectified voltage and forces the load to draw current in phase with the voltage. The shape of the current waveform is determined by a switching device 215, which is coupled to the output and a control circuit 220. The control circuit 220 provides an input to the switching device 215 and receives as input signals a signal from the output and a signal from the rectifier/boost node 225. This circuit may solve the power factor problem by shaping the current waveform to mimic the voltage waveform and to cause the current waveform to be in phase with the voltage waveform. However, the circuit utilizes at least five diodes, four of which are located in the bridge rectifier, and diodes are lossy components, which decreases the power efficiency of the circuit.

Accordingly, it would be beneficial to have fewer lossy components in a power factor correction circuit, where the power factor correction circuit accepts a wide range of input voltages and automatically adjusts the current waveform provided to be substantially sinusoidal in shape and in phase with the AC input voltage waveform.

It would also be beneficial to utilize the circuitry that is rectifying the AC input voltage to assist in providing power factor correction.

BRIEF DESCRIPTION OF THE DRAWINGS

FIG. 3(a) illustrates a bi-directional boost circuit for power factor correction in a power adapter according to an embodiment of the present invention;

FIG. 3(b) illustrates programming resistors within a cable according to an embodiment of the present invention;

FIG. 3(c) illustrates programming resistors with a connector according to an embodiment of the present invention;

FIG. 6(b) illustrates a clipped inductor current waveform as seen by the power source according to an embodiment of the present invention;

FIG. 8(a) illustrates a waveform created by a first waveform generator according to an embodiment of the present invention;

FIG. 8(b) illustrates a waveform created by a second waveform generator according to an embodiment of the present invention;

FIG. 8(c) illustrates a combination waveform generated by a first waveform generator and a second waveform generator according to an embodiment of the present invention;

DETAILED DESCRIPTION

Figure 1:
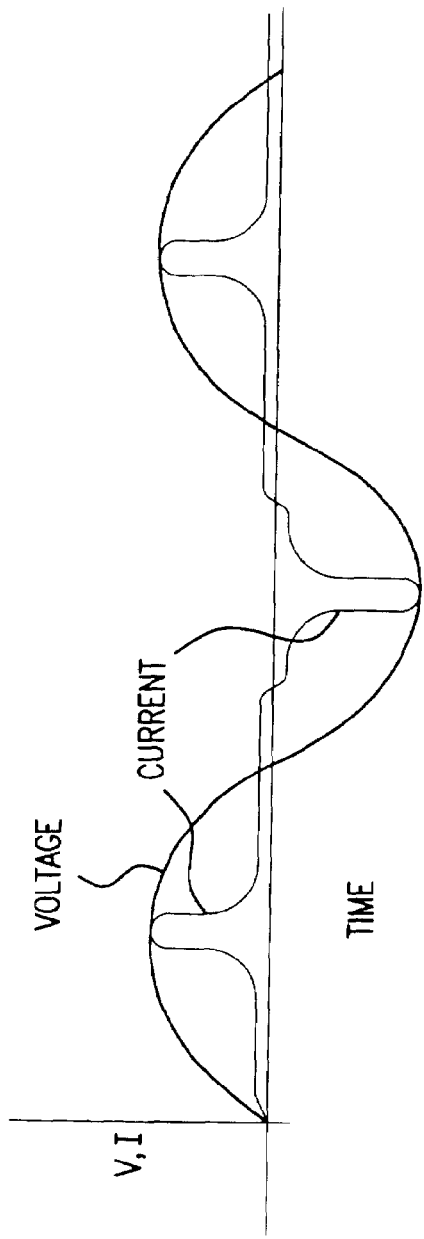
FIG. 1 illustrates a current and voltage waveforms for an electronic device that power factor conversion is designed to correct according to the prior art.
Figure 2:
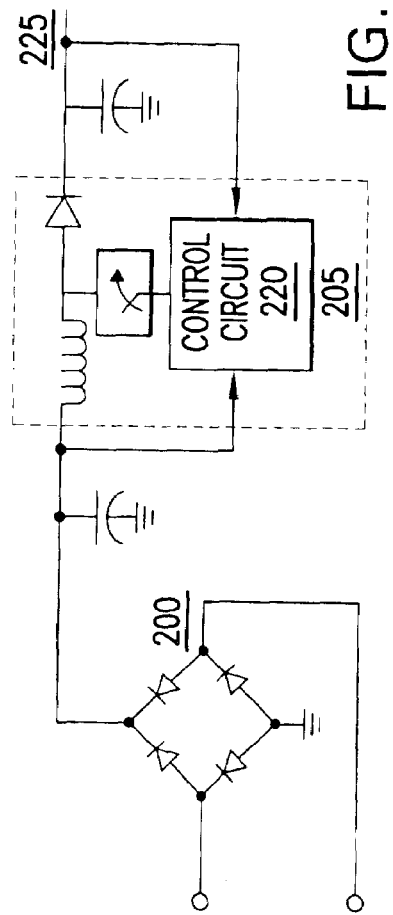
FIG. 2 illustrates a power factor correction circuit with a boost preconverter according to the prior art.

FIG. 3(a) illustrates a bi-directional boost circuit for power factor correction according to an embodiment of the present invention. The boost power factor conversion circuit may be utilized in an AC to DC power adapter or power converter. It is desirable for the power adapter to appear to the power supply line as a resistive load. In other words, the current waveform should be in phase and have approximately the same shape as the voltage waveform. This minimizes the demand on the utility provider because large, potentially instantaneous spikes of current demand may be avoided.

The power adapter 300 may include a pair of AC input terminals 301 and 302, an electronic magnetic interference (EMI) filter 303, a bi-directional boost circuit 304, a switching device 306, a transformer 308, a regulator 310, and an error correction system 312. The power adapter 300 may produce a power output having a regulated output voltage and a controlled output current.

The EMI filter 303 removes high-frequency noise from the power adapter. The bi-directional boost circuit 304 produces an intermediate DC voltage. In addition, the bi-directional boost circuit 304 provides power factor correction for the inductor current, as seen by the power source, and reduces any instantaneous current demand spikes. The power adapter 300 may achieve power factor correction by utilizing the bi-directional boost circuit 304 to generate a current waveform, as seen from the power source, that is substantially sinusoidal in shape and in phase with the AC input voltage. The bi-directional boost circuit 304 includes a control circuit 305 and a rectifying correction circuit or boost/switch circuitry 307. The rectifying correction circuit 307 receives the AC input voltage and produces an intermediate DC output voltage by converting and rectifying the AC input voltage. The control circuit 305 receives the intermediate DC output voltage and the AC input voltage. Based on the intermediate DC output voltage and the AC input voltage, the control circuit 305 transmits a signal to cause the rectifying correction circuit 307 to generate a current waveform, as seen by the power source, that is substantially sinusoidal in shape and in phase with the AC input voltage. The bi-direction boost circuit 304 only utilizes two diodes so the number of lossy components is reduced and the power adapter efficiency is improved. Additionally, the bi-directional boost circuit 304 utilizes the same circuitry to boost and rectify the AC input voltage and also to generate a current waveform that is substantially sinusoidal in shape and is in phase with the AC input voltage. The current waveform may be an inductor current waveform or the current waveform as measured at the inductor in the boost/switch circuitry 307.

The intermediate DC voltage is input to the switching device 306, which outputs a switched output. The switched output is input to a transformer 308, which outputs a second intermediate voltage. The second intermediate voltage is output to a regulator 310, which generates a power output with a regulated voltage and a controlled current. The power output is provided to a portable appliance 311. Because the power requirements of the portable appliances vary, e.g., CD players, need one input voltage and cell phones a second input voltage, the power output of the power adapter may be regulated, as described below. Generally, a programming signal, i.e., a voltage programming signal or a current programming signal, may be provided to an error correction system 312 and the error correction system 312 can transmit a signal to the regulator 310 to regulate the output voltage or to control the output current.

Specifically, the regulator 310 may receive the second intermediate voltage. In an embodiment of the invention, the regulator 310 may be a buck regulator, a boost regulator, or a buck-boost regulator, or any other regulator commonly utilized in the power adapter art. The regulator 310 generates a power output including a regulated voltage and a controlled current. The power output is provided to the portable appliance. Because different portable appliances have different operating voltage requirements and current needs, the power adapter 300 may need to be configured to output the necessary regulated voltage and/or controlled current.

The regulated voltage and the controlled current output from the regulator 310 is also input to an error correction system 312. The error correction system 312 may also receive a programming signal. The magnitude of the programming signal may be dependent upon a value of a resistor located in a cable coupled to the power supply. In an embodiment of the invention, the magnitude of the programming signal may be dependent upon a value of a resistor located in a connector coupled to the cable and the power supply. FIG. 3(b) illustrates a cable with programming resistors coupled to the power adapter and FIG. 3(c) illustrates a connector with programming resistors coupled to a cable and a power adapter according to an embodiment of the invention. In an embodiment of the invention, one or more resistors may be installed in one of the cable and the connector. The installation of the one or more resistors in the one of the cable and the connector and the coupling of the cable or the cable and the connector, may change the magnitude of the programming signal to be transmitted to the error correction system 312.

Illustratively, the one or more resistors may be coupled between a line in the cable or connector coupled to voltage program input and a line in the cable or connector coupled to ground. Illustratively, the one or more resistors may be coupled between a line in the cable or connector coupled to current program input and a line in the cable or connector coupled to ground. Illustratively, a first resistor may be coupled between a reference output and ground and a second resistor may be coupled between voltage program input and ground. This may produce a different magnitude of the programming signal because the first resistor may be coupled in parallel with a pullup resistor in the power adapter, which may modify the resistance value. Description of the resistors within the cable and the connector are found in the following patents, the disclosures of which are incorporated herein by reference: U.S. Pat. Nos. 5,838,554, entitled "Improved Small Form Factor Power Supply;" 5,949,213, entitled "Method and System for Recharging Batteries;" 6,172,884, entitled "Programmable Power Supply;" and 6,266,261, entitled "DC Power Adapter System."

Alternatively, a programming signal may be transmitted from an active device in the cable or from an active device in the connector. The active device may be a controller or an operational amplifier. The active device may transmit the programming signal to the error correction system 312. The active device may receive a voltage reference signal from the power adapter 300. Further discussion of such active devices are provided in the following patent applications, the disclosures of which are incorporated by reference: U.S. patent application Ser. Nos. 10/313,662, filed May 30, 2003, entitled "Active Tip", and 10/313,793, filed Dec. 6, 2002, entitled "Programmable Tip."

Figure 4:
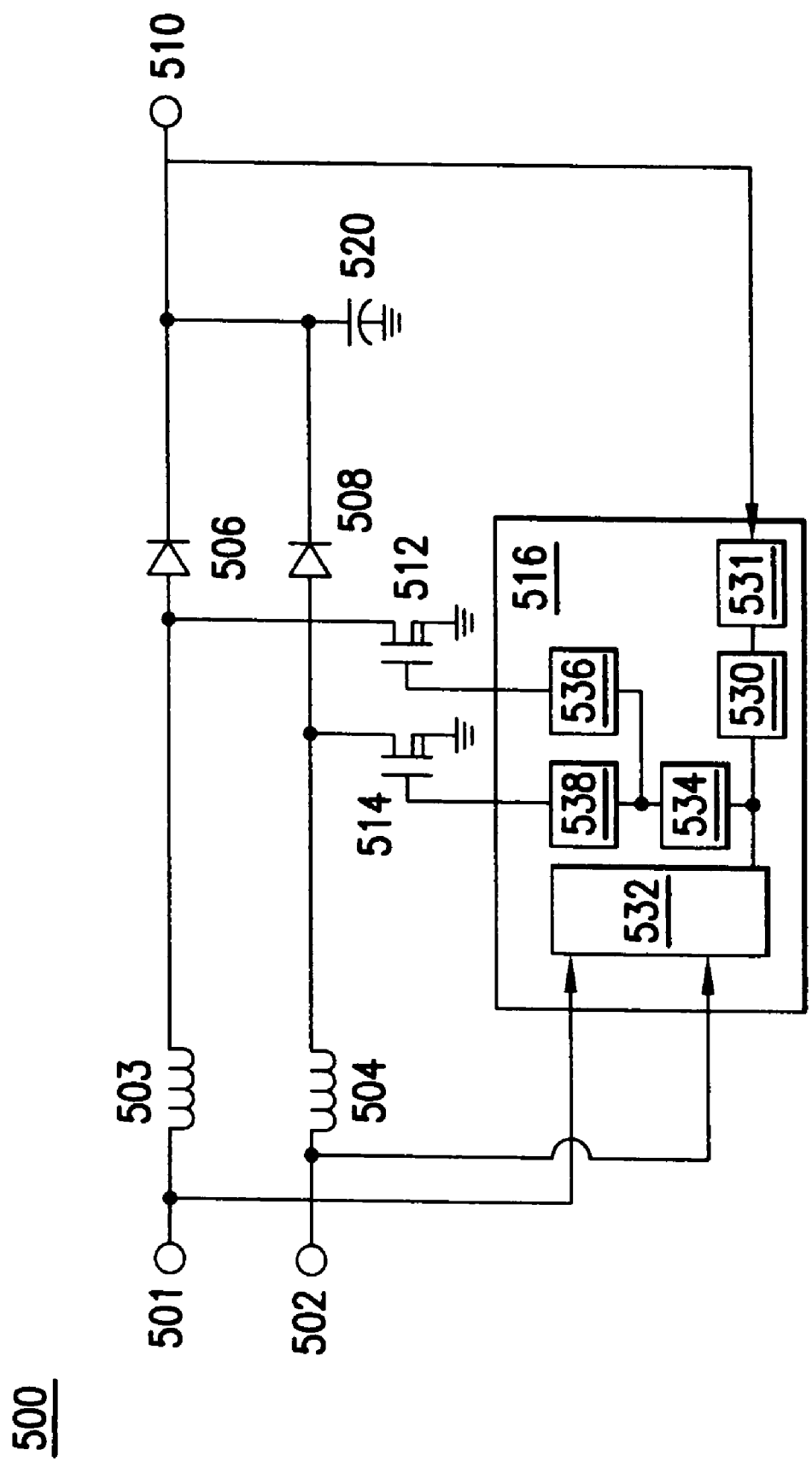
FIG. 4 illustrates a bi-directional boost circuit for power factor correction according to an embodiment of the present invention.

Specifically, FIG. 4 illustrates an example of a bi-directional boost circuit for power factor correction according to an embodiment of the present invention. In FIG. 4, the bi-directional boost circuit 307 of FIG. 3 is presented in more detail. The bi-directional boost circuit may include a first terminal 501, a second terminal 502, a first inductor 503, a second inductor 504, a first diode 506, a second diode 508, an output terminal 510, a first switch 512, a second switch 514, and a capacitor 520. The control circuit 305 of FIG. 3 (control circuit 516 in FIG. 4) may include an error amplifier 531, a pulse width modulator 530, a waveform generator 532, an integrator 534, and a pair of switch control circuits 536 and 538.

The first terminal 501 may be coupled to the first inductor 503, which may be coupled to the first diode 506 and a terminal of the first switch 512. The second terminal 502 may be coupled to the second inductor 504, which may be coupled to the second diode 508 and a terminal of the second switch 514. The first diode 506 and the second diode 508 may be coupled to the output terminal 510, along with a terminal of the capacitor 520, the other terminal of the capacitor 520 being coupled to ground. The control circuit 516 may be coupled to the output terminal 510, the first terminal 501, and the second terminal 502. The control circuit 516 may be coupled to the first switch 512 and the second switch 514. In an embodiment of the invention, the control circuit 516 may be coupled to a control terminal of the first switch 512 and a control terminal of the second switch 514, e.g., gate terminals when the first switch 512 and the second switch 514 are Field Effect Transistors.

The first terminal 501 and the second terminal 502 provides the AC input voltage from an input power source. The first inductor 503, the second inductor 504, first diode 506, the second diode 508, the first switch 512, and the second switch 514 receive the AC input voltage, converts the AC input voltage, rectifies the AC input voltage, and produces an intermediate DC output voltage, as discussed further below.

The first switch 512 may be a field effect transistor (FET) that has a first terminal coupled to the junction between the first inductor 503 and the first diode 506. The second switch 514 may be a FET and have a first terminal coupled to the junction between the second inductor 504 and the second diode 508. A second terminal of the first switch 512 and a second terminal of the second switch 514 may be coupled to ground.

During the positive cycle of the AC input, i.e., if a voltage at terminal 501 is greater than a voltage at a terminal 502, and the first switch 512 is on, energy is stored in the first inductor 503. If the first switch 512 is off, the energy stored in the first inductor is transferred through the first diode 506 to the capacitor 520. This causes the capacitor 520 to charge to a steady state DC voltage Vpos during the positive cycle of the AC input. The combination of the first diode 506 and the first switch 512 are utilized to rectify the AC input in the positive cycle. In an embodiment of the invention, the capacitor 520 may also smooth the ripple of the rectified DC output voltage.

During the negative cycle of the AC input, e.g., if a voltage at terminal 502 is greater than a voltage at terminal 501, and the second switch 514 is on, energy is stored in the second inductor 504. If the second switch 514 is not on, the energy stored in the second inductor 504 is transferred through the second diode 508 to charge up the capacitor 520 to a steady state voltage Vpos2. In an embodiment of the invention, the switches 512 and 514 may have an operational frequency of 80 to 120 Kilohertz. Although the magnitude of the AC input is negative during the negative cycle of the AC input, the current is flowing to the capacitor 520 in the same direction as the current flowing during the positive cycle of the AC input, and thus the voltage across the capacitor 520 is positive. The combination of the second diode 508 and the second switch 514 are utilized to rectify the AC waveform. In an embodiment of the invention, the capacitor 520 may also smooth the ripple of the rectified DC output. The intermediate DC output voltage is the addition of steady-state voltages Vpos and Vpos2, and has the shape of a rectified waveform, as smoothed by the filtering action of the capacitor 520.

The AC input voltage may also be provided to the power factor control circuit 516. In addition, the power factor control circuit 516 may receive the intermediate DC output voltage from the output terminal 510. The control circuit 516 may utilize the AC input and the DC output to create driving signals that are respectively input to the control, e.g., gate, terminals of the first switching device 512 and the second switching device 514. The control circuit 516 may control the current in the inductors 503 and 504 and may cause an inductor current to have a substantially sinusoidal shape. The substantially sinusoidal shape of the inductor current corresponds to a haversign signal generated within the control circuit 516 except that the inductor current sinusoidal waveform crosses a line, e.g., a reference potential while the haversign signal waveform does not cross a line on a graph and stays positive, the line, for example, representing a reference potential.

Figure 5A:
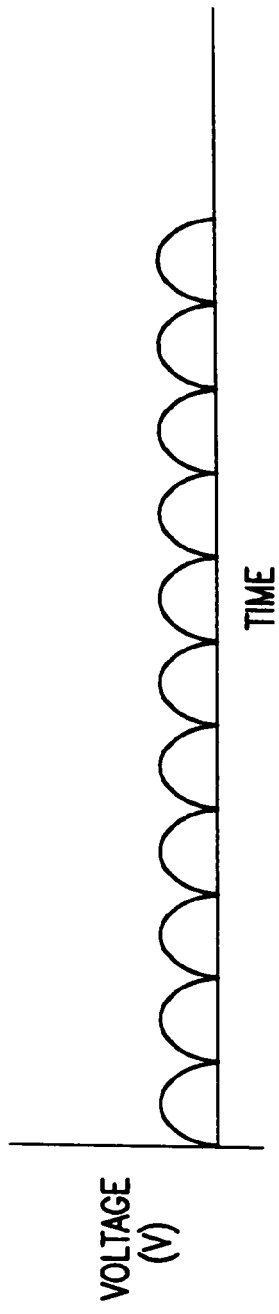
FIG. 5(a) illustrates a haversign signal according to an embodiment of the present invention.
Figure 5B:
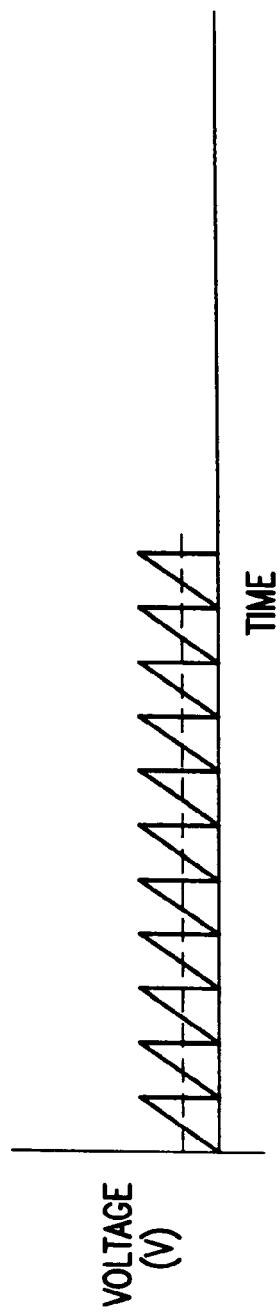
FIG. 5(b) illustrates a ramp signal and a DC error signal according to an embodiment of the present invention.
Figure 5C:
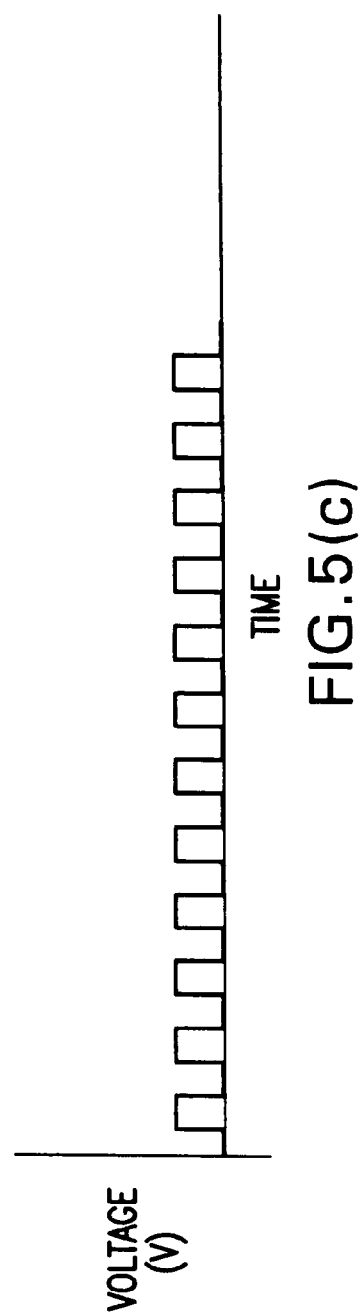
FIG. 5(c) illustrates a pulsed signal according to an embodiment of the present invention.

Specifically, the AC input voltage may be input to a waveform generator 532. The waveform generator 532 may generate a haversign waveform, as illustrated in FIG. 5(a). The intermediate DC output voltage is input to an error amplifier 531. The intermediate DC output voltage is compared to a reference voltage and a DC error signal is output from the error amplifier 531. A pulse width modulator 530 receives the DC error signal from the error amplifier 531 and compares the DC error signal to a ramp signal. In an embodiment of the present invention, the ramp signal may be oscillating in a frequency range of 80-120 Kilohertz. The DC error signal is illustrated as a dotted line in FIG. 5(b) and the ramp signal is illustrated as a solid line in FIG. 5(b). The pulse width modulator 530 outputs a pulsed signal. Illustratively, the pulsed signal for the comparison of the DC error signal and the ramp signal is illustrated in FIG. 5(c).

The haversign waveform and the pulsed signal are multiplied together to create a multiplied haversign waveform, which is input to an integrator 534. The amplitude of the multiplied haversign waveform is controlled by the pulsed signal. The integrator 534 strips off the high frequency characteristics of the multiplied haversign waveform and produces a haversign signal.

Figure 6A:
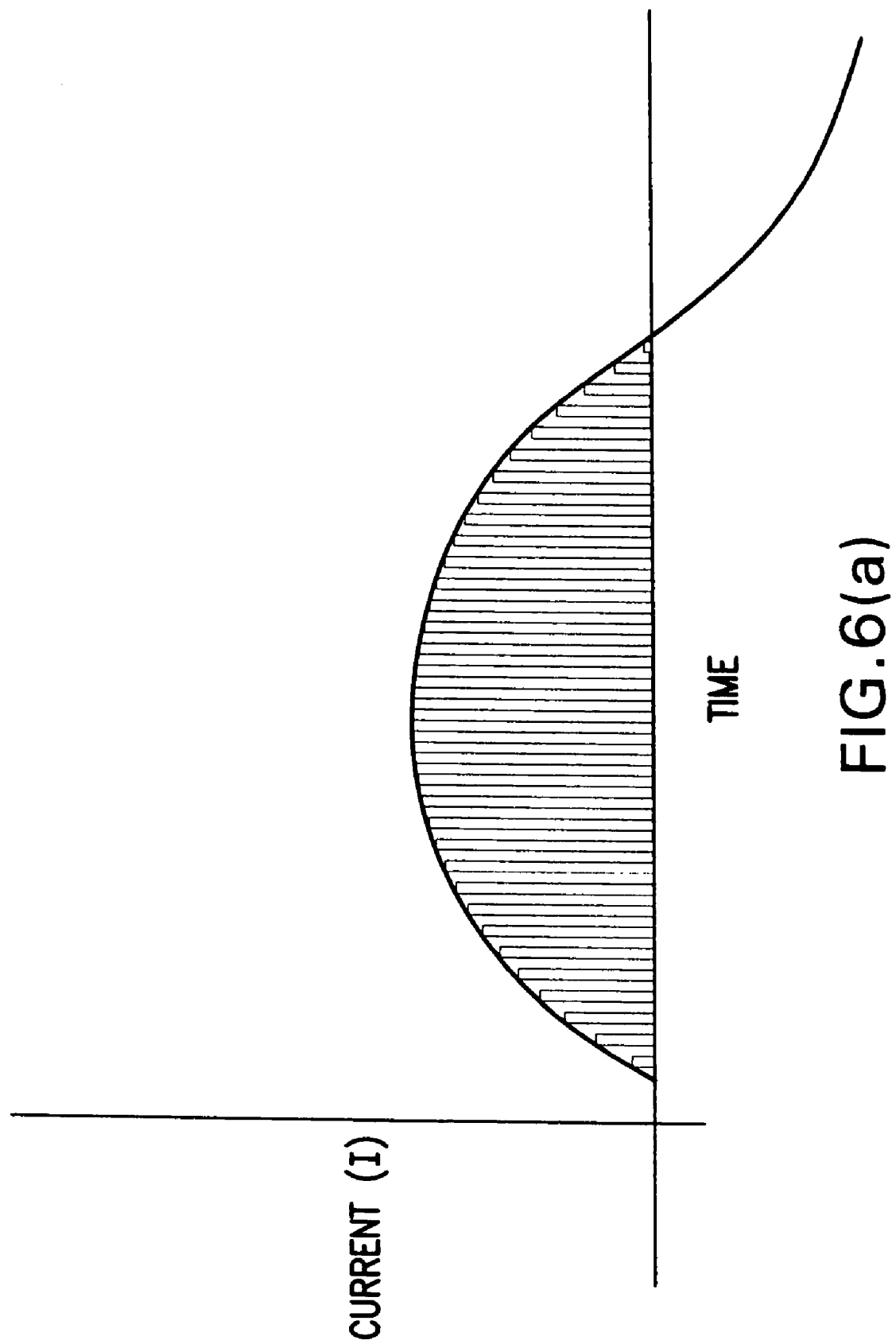
FIG. 6(a) illustrates the inductor current output, as seen by the input power source, including the high frequency pulses in the substantially sinusoidal envelope, according to an embodiment of the present invention.

In an embodiment of the invention, a haversign signal may be input to a first switch control circuit 536 and a second switch control circuit 538. During the positive cycle of the AC input, the first switch control circuit 536 monitors the actual current in the first inductor 503. The first switch control circuit compares a magnitude of the inductor current in the first inductor 503 to a threshold value, e.g., a magnitude of the haversign signal at specific point in time. When the inductor current is greater than the magnitude of the haversign signal input to the first switch control circuit 536, the first switch control circuit transmits a first drive signal to turn off the first switch 512. Because the haversign signal is sinusoidal in shape, the inductor current output during the positive cycle of the AC input from the first switch 512 may also have a sinusoidal shape. The frequency of a signal output from the first switch control circuit 536 is a high frequency, e.g., in the range of 80 Kilohertz to 120 Kilohertz. Because the first switch 512 is turning on and off at the high frequency, the inductor current output is actually a series of high frequency pulses operating which are formed in a substantially sinusoidal envelope, where the sinusoidal envelope is oscillating between 45-65 Hertz. FIG. 6(*a*) illustrates the inductor current output, as seen by the input power source, including the high frequency pulses in the substantially sinusoidal envelope. This may be referred to as an inductor current including a substantially sinusoidal shape. Due to the high frequency at which the first switch 512 operates, FIG. 6(*a*) is not drawn to scale.

During the positive portion of the input AC waveform, the second switch 514 is always on because a threshold value is never reached, i.e., the inductor current measured in the second inductor 504 by the second switch control circuit 538 never reaches the value of the haversign signal input to the second switch control circuit 538. Therefore, the second switch 514 is always turned on during the positive cycle of the AC waveform.

The haversign signal is also input to the second switch control circuit 538 and the second switch control circuit 538 outputs a second drive signal to drive the second switching device 514 during the negative cycle of the AC input. Again, because the haversign waveform is sinusoidal in shape, the inductor current, as seen from the power source, may also be sinusoidal in shape, i.e., may be a number of high frequency pulses that ride in a substantially sinusoidal envelope. During the negative cycle of the AC input, the magnitude of this substantially sinusoidal waveform may be negative, unlike the haversign signal which has a positive magnitude.

The power source may see the inductor current waveforms during the positive cycle and the negative cycle of the AC input as a substantially sinusoidal waveform that is in phase with the AC input voltage. Power factor correction is achieved because the substantially sinusoidal waveform is resistive in nature and the instantaneous peak demands for current has been reduced or eliminated.

In an embodiment of the invention, the first switch control circuit 536 and the second switch control circuit 538 may limit the amplitude of the inductor current. This may be beneficial for use in the United States, where power factor correction is not required, and thus the inductor current may not need to be sinusoidal in shape. In order to output the necessary power within the United States, approximately double the amount of current may need to be utilized in order to produce the same power with half the current in Europe. This large amount of current may require larger size inductors to handle the amount of current in the device which may result in less efficiency of the power supply. This loss of efficiency may be neutralized by clipping the substantially sinusoidal waveform of the inductor current as seen from the power source, i.e., limiting the peak current of the sinusoidal waveform, and producing more of a trapezoidal- or square-shaped inductor current waveform.

In this embodiment of the invention, the first switch control circuit 536 may limit the amplitude of the inductor current on the positive half of the AC input if the magnitude of the inductor current exceeds a clipping threshold value. In other words, the first switch control circuit 536 clips the peak of the inductor current waveform, making the waveform have more of a square-wave or a trapezoidal shape as seen by the power source, rather than a sinusoidal shape. In this embodiment, the peak current in the inductors is lower. During the negative cycle of the waveform, the second switch control circuit 538 may also limit the amplitude of the inductor current if the magnitude exceeds the clipping threshold value. FIG. 6(*b*) illustrates an ideal version of a clipped inductor current waveform as seen by the power source according to an embodiment of the present invention. Again, the actual inductor current would be a series of high frequency pulses which are either square or trapezoidal in shape. A clipping threshold value may be set by installing a component across pins of the first switch control circuit 536 or the second switch control circuit 538. FIG. 6(*b*) illustrates the high frequency pulses that create the clipped inductor current waveform. Again, FIG. 6(*b*) is not drawn to scale due the high frequency of the switches being activated.

Figure 7:
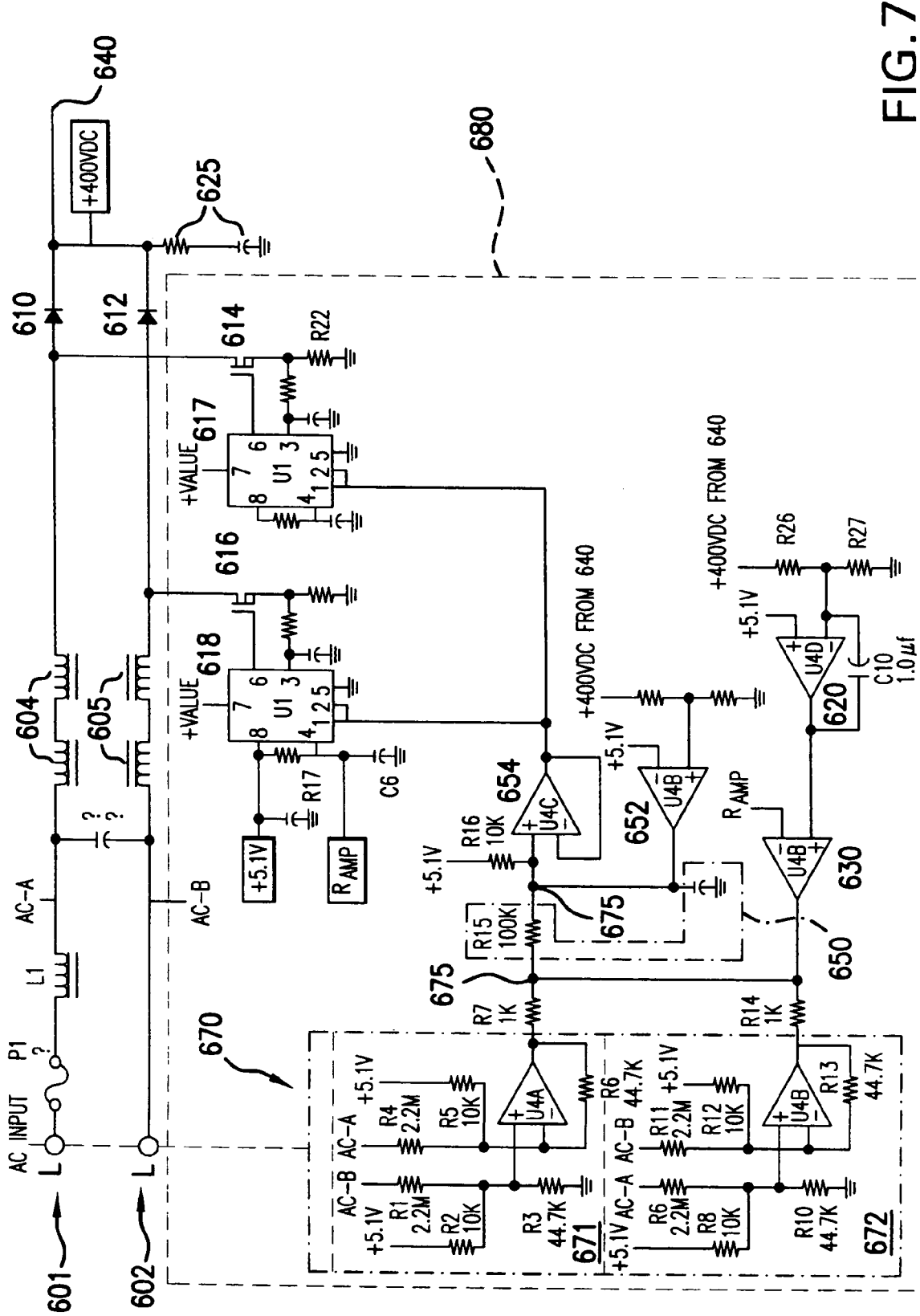
FIG. 7 illustrates a schematic of a power factor correction circuit according to an embodiment of the present invention.

FIG. 7 illustrates a schematic of the power factor correction circuit according to an embodiment of the present invention. A first terminal 601 of the AC line is coupled to a first terminal of a first inductor 604 and a waveform generator 670 (through AC-A). A second terminal 602 of the AC line is coupled to a first terminal of a second inductor 605 and the waveform generator 670 (through AC-B). A second terminal of the first inductor 604 is coupled to a first diode 610 anode and is coupled an output terminal of a first switching device 614. A second terminal of the second inductor 605 is coupled to a second diode 612 anode and an output terminal of a second switching device 616.

The control terminal of the first switching device 614 is coupled to the first current mode controller 617. The control terminal of the second switching device 616 is coupled to the second current mode controller 618. The first diode 610 cathode and the second diode 612 cathode are coupled to the output terminal 640 of the power factor correction circuit 600. The output terminal 640 is coupled to a first error amplifier 620 and also may be coupled to a second amplifier 652.

The error amplifier 620 compares a reference voltage with the high voltage intermediate DC output present at the output terminal 640. The error amplifier 620 outputs a voltage error signal. For example, in the embodiment of the invention illustrated in FIG. 7, the voltage input to the inverting input of the error amplifier 620 may be approximately 5.0 volts, which is determined after the high voltage DC output is input to a voltage divider network created by resistors R26 and R27. In the embodiment of the invention illustrated in FIG. 7, the voltage input to the inverting input of the error amplifier 620 may be compared to a reference voltage of 5.1 volts.

The voltage error signal output from the error amplifier 620 may be input into a pulse width modulator 630. The pulse width modulator 630 may compare a periodic ramp signal with the DC signal output from the error amplifier 620. The pulse wide modulator 630 may generate a pulsed signal. In an embodiment of the invention, the ramp signal may be generated by the current mode controllers 617 and 618. For example, the values of the resistor R17 and capacitor C6 attached to pin 4 of the current mode controller 618 may determine the frequency of the ramp signal, as illustrated by the box marked Ramp in FIG. 7.

The pulsed signal may be multiplied by a haversign signal generated by a waveform generator 670. The waveform generator 670 may include a first waveform generator 671 and a second waveform generator 672. FIG. 8(a) illustrates a waveform created by a first waveform generator according to an embodiment of the invention. A first waveform generator 671 receives the AC input from terminals 601 and 602 and acts as a differential amplifier to create a sinusoidal shaped waveform for a positive cycle of the AC input and no waveform for the negative cycle of the AC input, as illustrated in FIG. 8(a). A second waveform generator 672 receives the AC input from terminals 601 and 602, except the second waveform generator subsystem has the signal from terminal 601 input to the non-inverting input of the operational amplifier U4B and the signal from terminal 602 input into the inverting input of the operation amplifier U4B, which is opposite to the inputs to the first waveform generator. FIG. 8(b) illustrates a waveform created by a second waveform generator according to an embodiment of the present invention. The second waveform generator 672 creates a sinusoidal waveform opposite in phase to the waveform generated by the first waveform generator subsystem 671, as illustrated in FIG. 8(b), i.e., a sinusoidal waveform is generated during the negative cycle of the AC input and no waveform is generated during the positive cycle of the AC input.

The output of the first waveform generator 671 and the second waveform generator 672 are summed at node 675. The resulting waveform is a haversign waveform, as illustrated in FIG. 8(c).

The multiplication of the haversign and the pulsed signal may produce a multiplied haversign output at node 676. In other words, the pulsed signal may control the magnitude of the haversign.

The integrator 650 strips the multiplied haversign output of high frequency characteristics created by the pulse wide modulator's 630 operating frequency and creates an integrated haversign waveform. The high frequency characteristics are generated by the pulse width modulator 630 pulsing at the ramp signal frequency. In one embodiment of the invention, the ramp signal frequency may be 100 Kilohertz. As illustrated in FIG. 7, the integrator 650 may be formed by a resistor R15 and a capacitor C19.

Comparator U5A 652 may respond to instantaneous large changes in the magnitude of the intermediate DC output voltage. Comparator U5A 652 may generate a clamp signal to prevent the control circuit from responding to large instantaneous changes in intermediate DC output voltage magnitude. If the large instantaneous change in the magnitude of the intermediate DC output voltage is detected by U5A 652, U5A 652 may output a signal to clamp the integrated haversign waveform.

U4C 654 is a buffer for the integrated haversign waveform and outputs a haversign signal. The integrated haversign waveform is input to the non-inverting input of the amplifier and the feedback signal from U4C 654 is input to the inverting input of U4C 654. These connections enable the operational amplifier U4C 654 to have a unity gain at the output and to operate as a buffer.

A control circuit 680 controls current in the inductors L2 (L2-A and L2-B) 604 and L3 (L3-A and L3-B) 605. The current in the inductors 604 and 605 is controlled by having the current track the voltage output, i.e., the haversign signal, from U4C 654. The current mode controllers 617 and 618 control the current flow through the inductors 604 and 605 by turning off and on switches 614 and 616, respectively. The input to the current mode controllers 617 and 618 is a voltage from U4C with a waveshape of a haversign, i.e., a haversign signal. For example, the current mode controllers 617 and 618 are voltage-to-current converters so the inductor current tracks the waveform shape of the haversign signal input to the current mode controllers 617 and 618. When the AC input reverses, i.e., goes to the negative cycle, the inductor current is traveling in the opposite direction, i.e., has a negative value, and instead of precisely tracking the haversign signal, the inductor current waveform maintains the shape of the haversign signal, but the inductor current is negative with respect to a reference potential and the inductor current crosses the reference potential when the AC input reverses. Therefore, the resulting AC waveform is a substantially sinusoidal current that crosses a reference potential when it switches from a positive cycle to a negative cycle.

The current mode controllers 617 and 618 receive the haversign signal from the buffer U4C 654. In the embodiment of the invention illustrated in FIG. 6, the haversign signal is input to pins 1 and 2 of current mode controllers 617 and 618. During the positive cycle of AC input, e.g., when the voltage at terminal 601 is greater than the voltage at terminal 602, the current mode controller 617 monitors the inductor current through inductors L2 604. In an embodiment of the invention, the current mode controller 617 monitors the inductor current via pin 3 by measuring the current across resistor R22. The current mode controller 617 compares the monitored inductor current to a threshold value. Illustratively, the threshold value is the input from buffer U4C 654, which is a value of the haversign signal at an instant in time. If the monitored inductor current is larger than the threshold value, then the current mode controller 617 may turn off the switching device 614. In other words, the current mode controller 617 is allowing the inductor current to track up the value of the haversign signal at that moment in time, but does not allow the inductor current to go higher than the value of the haversign signal. Thus, the current in the inductor 604 tracks the haversign waveform.

The current mode controller 618 activates switch 616 continuously during the positive cycle of the AC input. The current mode controller 618 monitors the current in the inductors 605 and compares it to the threshold value. The inductor current being monitored has a negative value, however, because the current is flowing from common ground through the switch 616 and back to the inductor 605. Because the threshold value is positive, the current value never reaches the threshold value and switch 616 is continuously activated during the positive cycle of the AC input. For example, during the positive cycle of the AC input, the current path is from inductors 604 through switch 614 through resistor R22 to common ground. Then, the current path returns from common ground through resistor R29 through switch 616 and to inductors 605. The current mode controller 618 is monitoring the inductor current, which is flowing in a negative direction through the resistor which is utilized for monitoring, e.g., R19. Because the value of the inductor current is negative, the value of the inductor current never reaches the threshold value, and switch 616 is always turned on during the positive cycle of the AC input.

Conversely, when the AC input is in a negative cycle, the value of the AC input at terminal 602 is greater than the value of the AC input at terminal 601, current mode controller 618 turns on and off switch 616 and current mode controller 617 turns switch 614 on continuously. Illustratively, during the negative cycle of the AC input, the current mode controller 618 is monitoring the inductor current in inductors 605 when switch 616 is on via resistor R19. The current mode controller 618 compares' the inductor current to the value of the haversign signal input from buffer U4C 654. If the inductor current is larger than the voltage input, then the switch 616 is turned off. Thus, the current in the inductors 605 tracks the shape of the input voltage from amplifier 654, i.e., the haversign shape.

Because the AC input is in the negative cycle and the value is negative with respect to a reference potential, the inductor current tracks the haversign shape but has a negative value with respect to a reference potential. Thus, during the positive and negative cycle of the AC input, the inductor current waveform is sinusoidal and crosses the reference potential when the AC input moves from the positive cycle to the negative cycle, and vice versa.

When the AC input is in a negative cycle, current mode controller 617 activates switch 614 continuously. The current path when the AC input is in a negative cycle is for inductor 605 through switch 616 to resistor R19 to common ground, back from common ground through R22 through switch 614 and back to inductor 604. Thus, the value of inductor current across R22 is negative. The value of the inductor current is monitored by current mode controller 617. Because the value is negative, the value of the inductor current never reaches the threshold value established by the haversign signal input to the current mode controller 617 from U4C 654. Thus, the current mode controller 617 does not turn switch 614 off during the negative cycle of the AC input.

As discussed previously, in the United States, power factor correction is not necessary. Therefore, the current waveform may not need to be sinusoidal in shape. If the power adapter is to be utilized within the United States, the current mode controllers 617 and 618 may be configured to limit the peak value of the inductor current. The inductor current may be limited by configuring the current mode controllers 617 and 618 to utilize a lower threshold value, and not the threshold value input from buffer U4C 654. This may create a current waveform that has a squarewave or a trapezoidal waveform rather than a sinusoidal waveform. The power adapter may still deliver the necessary power to the portable appliance. The current mode controllers 617 and 618 may compare, during the positive and negative cycles of the AC input, respectively, the inductor current to a clipping threshold value. The clipping threshold may be the lower threshold value. If the inductor current is higher than the clipping threshold, then the current mode controller 617 and 618 may turn off switches 614 and 616, respectively. This may result in a current waveform that has a squarewave shape or a trapezoidal shape.

The power factor correction circuit of the present invention has an increased efficiency due to the lower number of lossy components, i.e., diodes, that are utilized in the design. In a standard power factor correction circuit, at least five diodes are utilized (four of the diodes being utilized in a bridge rectifier). In the power factor correction circuit of the present invention, only two diodes are utilized.

In regards to the voltage, the power factor correction circuit 600 may receive the AC input voltage on the AC input first terminal 601 and the AC input second terminal 602. The AC voltage input may be rectified to produce a rectified DC voltage. The AC input is rectified utilizing the first diode 611, the second diode 612, the diode characteristics of the first switching device 614, and the diode characteristics of the second switching device 616. In other words, two actual diodes, the first diode 610 and the second diode 612, are utilized along with the diode characteristics of the first switching device 614 and the second switching device 616 to rectify the AC input voltage.

The intermediate DC output voltage is created during a positive cycle of the AC waveform, when switch 614 opens and the energy that has been stored in inductors L2 604 is transferred through diode 610 to charge capacitors C2 and C3 620. The current input to the capacitor 620 creates a rectified DC output for the positive cycle of the AC input. The current then is returned to terminal 602 via a path that includes going through the reference ground to R19, switching device 616, and inductors 605.

The intermediate DC output voltage is created during the negative cycle of the AC waveform, when switch 616 opens and the energy that has been stored in inductors L3 605 is transferred through diode 612 to charge capacitors C2 and C3 625. The current is flowing across the capacitors C2 and C3 625 in the same direction as it is during the positive cycle of the AC, so the voltage across the capacitors C2 and C3 625 is positive. The current path during the negative cycle of the AC waveform follows the path of reference ground through R22, switching device 614, and inductors 605 to terminal 601.

The voltage waveform created during the positive cycle and the negative cycle is added to create an intermediate DC output voltage. The capacitors C2 and C3 625 filter the full-wave rectified voltage to create the intermediate DC output voltage with minimal ripple.

Figure 9A:
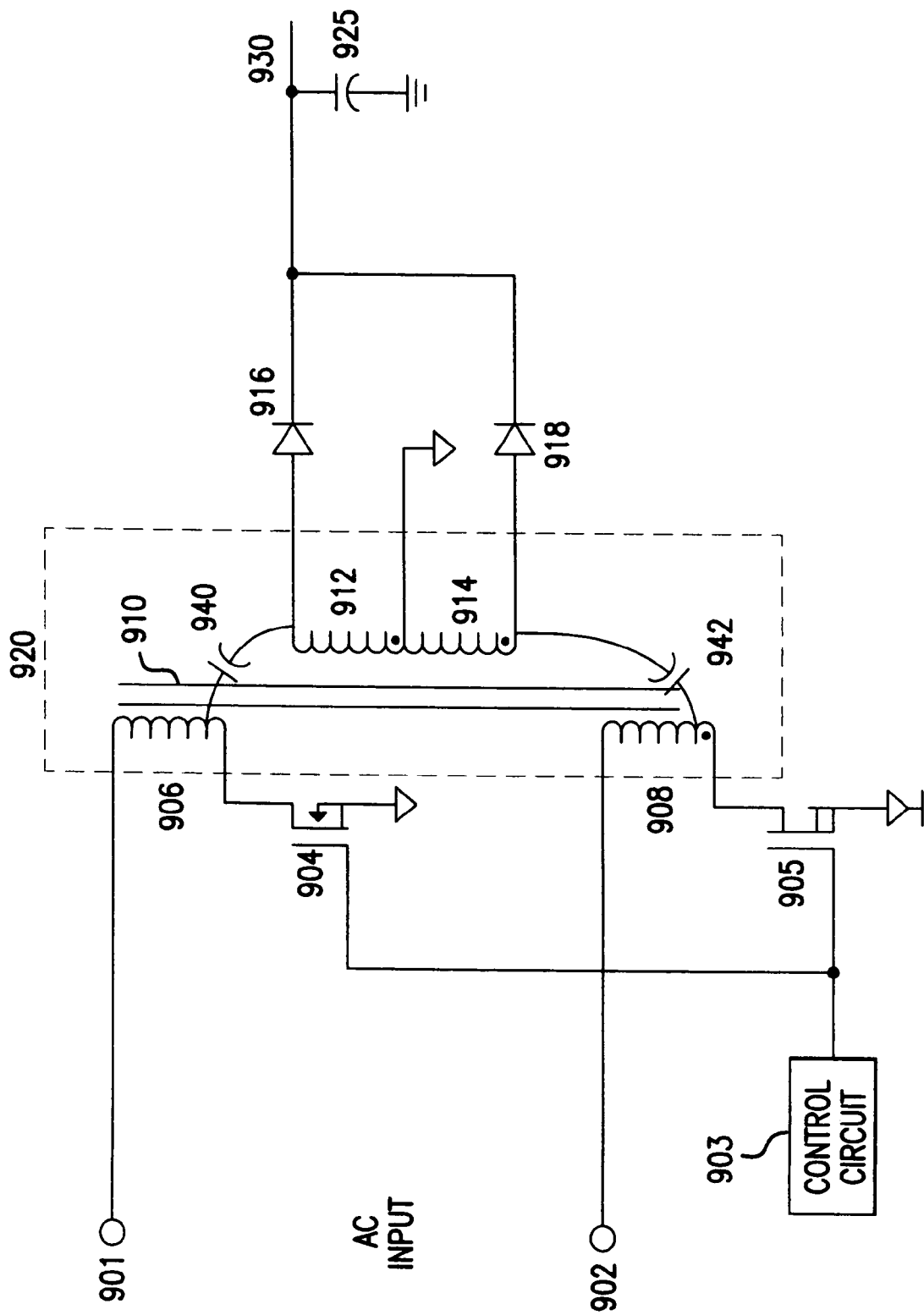
FIG. 9(a) illustrates a second embodiment of the power factor correction circuit according to an embodiment of the present invention.

FIG. 9(*a*) illustrates a second embodiment of the power factor correction circuit according to an embodiment of the present invention. In this embodiment, the power factor correction circuit replaces the boost and switch circuitry 304, the switching device 306, and the transformer 308 in FIG. 3. A control circuit 516, as described in FIG. 4, may be utilized with the embodiment illustrated in FIG. 9(*a*). In an embodiment of the invention, a slightly modified control circuit 516 may be utilized with the embodiment illustrated in FIG. 9(*a*). In one embodiment of the invention, the power factor correction circuit 900 may be located in AC to DC power converter. In an embodiment of the invention the power factor correction circuit 900 may be located in an electronic device that receives as input an AC voltage and needs to maintain a waveform that meets with European power drawing requirements, e.g., such as a sinusoidal shaped current waveform. The power factor correction circuit of the present invention produces an isolated power-factored corrected rectified current waveform at the intermediate node 930. In the illustrated embodiment, only two diodes are utilized in the power factor correction circuit 900, which results in a lower power loss and energy consumption for the circuit, which normally utilized at least six diodes. The present invention handles power factor correction, isolating, transforming of the voltage, and rectifying of the voltage in one power stage, which eliminates the need for a bridge rectifier circuit.

The power factor correction circuit 900 receives an AC input voltage via a first AC input terminal 901 and a second AC input terminal 902. The first AC input terminal 901 is coupled to a first primary winding 906 of the transformer 920. The first primary winding is coupled to a first terminal of a first switch 904. A control terminal of the first switch 904 is coupled to a control circuit 903. A second terminal of the first switch is coupled to a reference ground.

The second AC input terminal 902 is coupled to a first terminal of a second primary winding 908. A second terminal of the second primary winding is coupled to a first terminal of a second switch 905. A second terminal of the second switch 905 is coupled to the reference ground. A control terminal of the second switch 905 is coupled to a control circuit 903. In an embodiment of the invention, the control circuit 903 may be configured so that both the first switch 904 and the second switch 905 turn on simultaneously. In an embodiment of the invention, the control circuit 903 may be configured so that one switch is always turned on and the other switch may be turned off and on. For simplicity of discussion, the embodiment where the first switch 904 and the second switch 905 are turned on simultaneously is discussed below.

The transformer 920 includes a first primary winding 906, a second primary winding 908, a transformer core 910, a first secondary winding 912, and a second secondary winding 914. In an embodiment of the invention, the transformer 920 may utilize planar magnetics. Traditional magnetics with solid or stranded wire may also be used utilized, however the effect of the noise cancellation outlined below may be reduced.

In an embodiment of the present invention, the physical configuration of the transformer 920 forms a pair of capacitors 940 and 942. The first primary winding 906 and the second primary winding 908 are both located on a circuit board that acts as a plate for the pair of capacitors. The first secondary winding 912 and the second secondary winding 914 are located on a circuit board that acts as a second plate for the pair of capacitors. The core 910 is the dielectric material for the pair of capacitors. Capacitor 940 is formed between the first primary winding 906 and the first secondary winding 912. Capacitor 942 is formed between the second primary winding 908 and the second secondary winding 914.

A first terminal of the first secondary winding 912 is coupled to a first terminal of a first rectification diode 916. A second terminal of the first secondary winding 912 is coupled to a reference ground. A first terminal of the second secondary winding 914 is coupled to the reference ground. A second terminal of the second secondary winding 914 is coupled to a first terminal of a second rectification diode 918.

A second terminal of the first rectification diode 916 and the second rectification diode 918 are coupled to an intermediate node 930. The intermediate node 930 is coupled to a first terminal of a capacitor 925 and a second terminal of the capacitor 925 is coupled to the reference ground. In an embodiment of the invention, MOSFETS may be utilized in place of the rectification diodes 916 and 918 as active rectifiers, also is known as synchronous rectification.

In operation, the power factor correction circuit provides a regulated intermediate DC voltage at the intermediate node 930 and across the capacitor 925. In an embodiment of the invention, the power factor correction circuit generates a substantially sinusoidal current waveform that enables a power factor converter to meet the input line harmonic requirements of EN691000-3-2. In an embodiment of the invention, the power factor correction circuit generates a clipped current waveform. In an embodiment of the invention, the waveform generated by the power factor correction circuit is seen or viewed from the input terminals, and thus the power supplier.

Figure 9B:
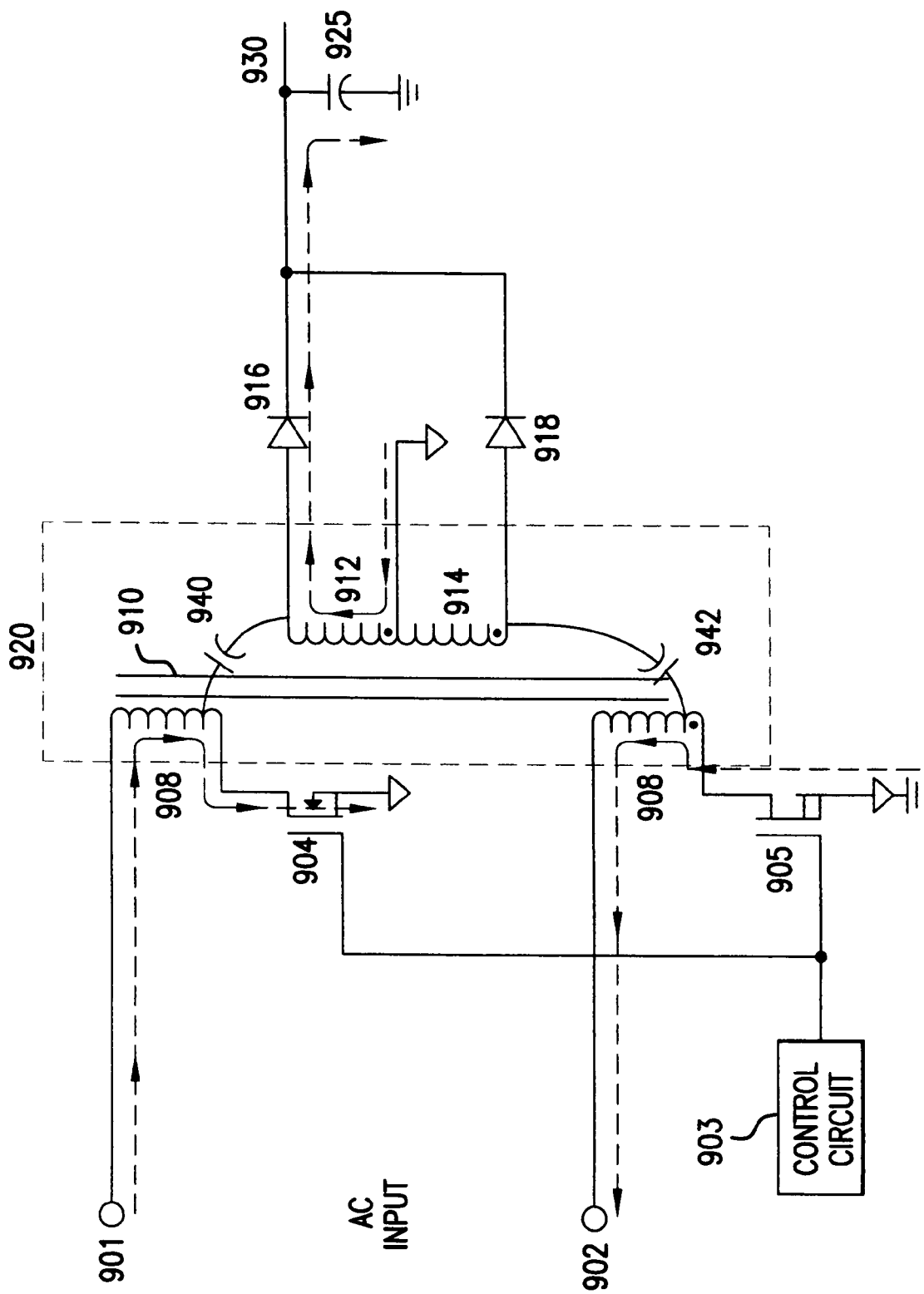
FIG. 9(b) illustrates current flow during the positive cycle of the AC input according to an embodiment of the present invention.

FIG. 9(b) illustrates current flow during the positive cycle of the AC input according to an embodiment of the present invention. The positive cycle of the AC input is defined as when the voltage at terminal 901 is greater that the voltage at terminal 902. During the positive cycle of the AC input, when the first switch 904 and the second switch 905 are on, the current flows from the first AC input terminal 901 to the first terminal of the primary winding 906 to the second terminal of the primary winding 906 through the first terminal of the switch 904 to the second terminal of the first switch and then to the reference ground. The current then flows from the second terminal of the second switch 905 from the reference ground through the first terminal of the second switch 905 to the second terminal of the second primary inductor 908 through the first terminal of the second primary inductor 908 and to the second input terminal 902.

As the first switch 904 and the second switch 905 are switched off, the current is induced via the magnetic core to the secondary side of the transformer 920. Due to the configuration of the transformer windings, which are indicated by the dots on the transformer 920, during the positive cycle of the AC input, the current flows from the reference ground to the second terminal of the first secondary winding 912 to the first terminal of the first secondary winding 912 through the first rectification diode 916 to the first intermediate node 930 to the capacitor 925 and then to the reference ground.

In one embodiment of the invention, the current waveform may be substantially sinusoidal in shape after exiting the first terminal of the first secondary winding 912. After exiting the first terminal of the first secondary winding, the current waveform may be a large number of pulses forming a substantially sinusoidal envelope. The first rectification diode 916 may rectify the current waveform to produce a haversign waveform.

The voltage transferred to the intermediate node is dependent on the turns ratio of the primary windings to the secondary windings. During the positive cycle of the AC input, when the first switch 904 and the second switch 905 are on, energy is stored up in the core 910 of the transformer 920. During this time the voltage across the first primary winding 906 may be labeled as $V_{primary1}$. The voltage on the secondary side, i.e., $V_{secondary1}$ of the transformer is determined by multiplying $V_{primary1} * (N_{secondary}/N_{primary})$ where N represents the number of turns in the windings. For example, if the voltage across the first primary winding is 200 volts, the turns ratio is 20 to 1, and the voltage being regulated to at intermediate node 930 is, for example +15 volts, then when the first switch 904 and the second switch 905 are on, $V_{secondary1}$ (the voltage across the first secondary winding) is equal to −10 Volts. $V_{secondary1}$ is −10 Volts, that is the anode of rectifying diode 916 is −10 volts with respect to the secondary reference ground, because of the orientation of the first secondary winding of the transformer 920. This results in the back-biasing of the first rectifying diode 916 and thus no voltage is transferred to intermediate node 930.

In this example, $V_{secondary2}$ (the voltage across the second secondary winding) is also −10 volts, that is, the anode of the second rectifying diode 918 is +10 volts with respect to secondary reference ground. The voltage does not move across the second rectifying diode 918 because the anode of the second rectifying diode 918 has +10 volts and the cathode of the second rectifying diode has +15 volts so no voltage passes to the intermediate node 930 and the capacitor 925.

During the positive cycle of the AC input, when the first switch 904 and the second switch 905 are turned off, the energy that was stored in the core 910 of the transformer 920 is transferred into the windings on the secondary side of the power factor correction circuit. $V_{secondary1}$ continues to build up voltage until it is greater than $V_{intermediate}$ (the voltage at the intermediate node 930) by the forward drop of rectifying diode 916 and then $V_{secondary1}$ transfers energy through rectifying diode 916 to the intermediate node 930 and the capacitor 925 to build up the $V_{intermediate}$ to the desired regulating voltage. Illustratively, if the desired regulating voltage is 17 volts, then the control circuit 903 receives this information from the power converter, drives the switches to generate a corresponding voltage on the primary side of the transformer 920, and transfers this energy to the secondary side of the transformer 920. Due to the orientation of the second secondary winding 914, $V_{seconday2}$ is driven to a negative voltage when the first switch and the second switch are turned off band thus no voltage moves across the second rectifying diode 918.

Figure 9C:
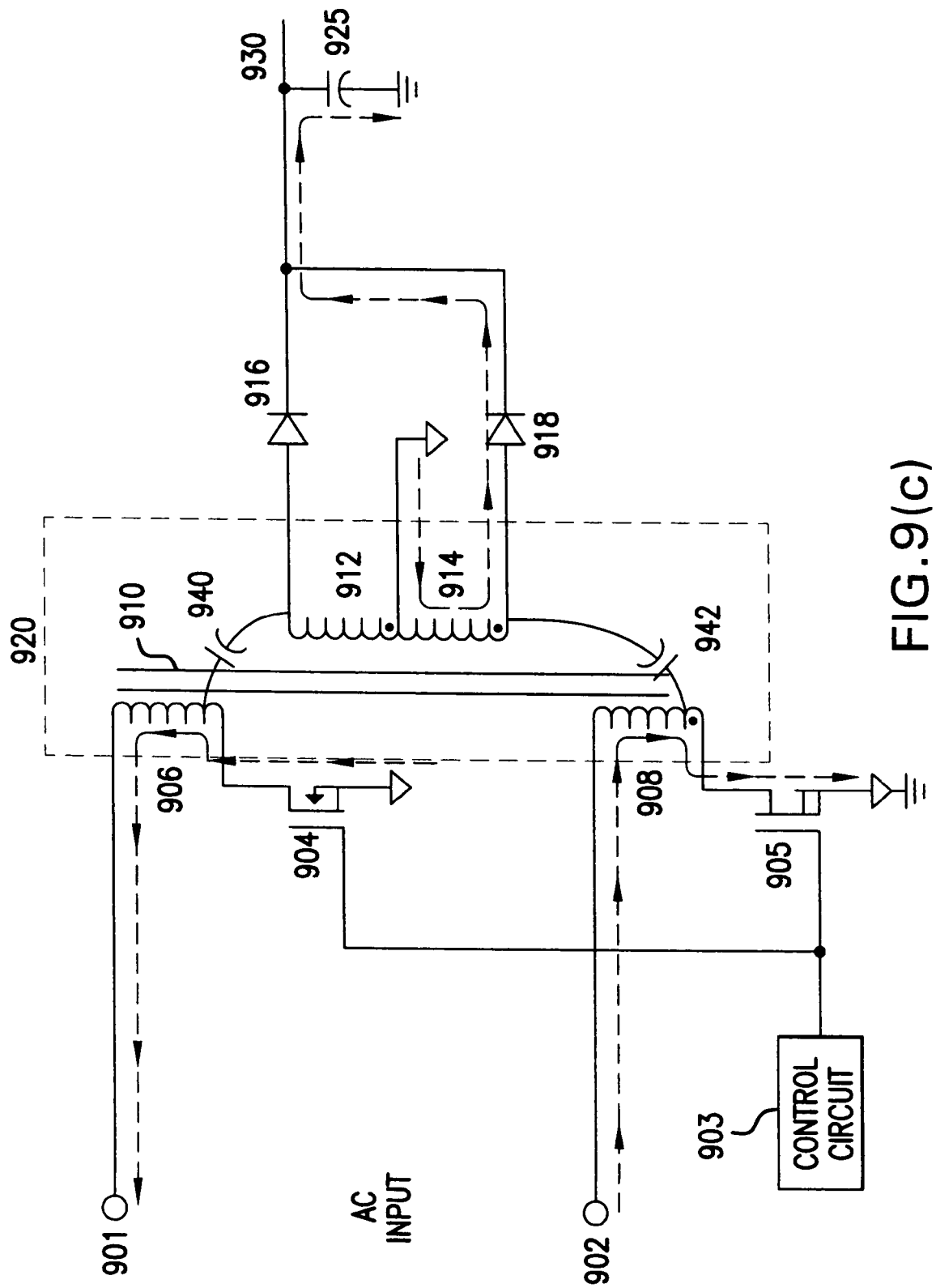
FIG. 9(c) illustrates a current flow during the negative cycle of the AC input according to an embodiment of the present invention.

FIG. 9(c) illustrates current flow during a negative cycle of the AC input according to an embodiment of the present invention. During the negative cycle of the AC input, when the voltage at input terminal 902 is greater than the voltage at input terminal 901, the current flows, when the first switch 904 and the second switch 905 are on, as illustrated in FIG. 9(c). The current flows from the second input terminal 902 through the first and second terminals of the second primary winding 908, the first and second terminals of the switch 905 to reference ground. The current then flows from the reference ground through the second terminal and the first terminal of the first switch, through the second terminal and the first terminal of the first primary winding 906 to the first input terminal 901.

As the first switch 905 and the second switch 905 are switched off, the current is induced via the magnetic core to the secondary side of the transformer 920, specifically the second secondary winding 914. Due to the configuration of the transformer windings, which are indicated by the dots on the transformer 920, during the negative cycle of the AC input, the current flows from the reference ground to the first terminal of the second secondary winding 914 to the second terminal of the second secondary winding 914 through the second rectification diode 918 to the first intermediate node 930 to the capacitor 925 and then to the reference ground.

In one embodiment of the invention, the current waveform may be substantially sinusoidal in shape after exiting the first terminal of the second secondary winding 914. After exiting the second terminal of the second secondary winding, the current waveform may be a large number of pulses forming a substantially sinusoidal envelope. The second rectification diode 918 may rectify the current waveform to produce a second half of the haversign waveform. The first rectifying diode 916 and the second rectification diode rectify the current going into node 930

During the negative cycle of the AC input, when the first switch 904 and the second switch 905 are on, energy is stored up in the core 910 of the transformer 920. $V_{secondary2}$ is $-10$ Volts, that is the anode of rectifying diode 918 is $-10$ volts with respect to the secondary reference ground, because of the orientation of the second secondary winding 914 of the transformer 920. This results in the back-biasing of the second rectifying diode 918 and no voltage is transferred to intermediate node 930. In this example, $V_{secondary1}$ (the voltage across the first secondary winding) is $+10$ volts, that is the anode of rectifying diode is $+10$ volts with respect to the secondary reference ground. The voltage does not move across the first rectifying diode CR2 because the anode of the first rectifying diode 916 has $+10$ volts and the cathode of the second rectifying diode 918 has $+15$ volts (from the regulating voltage) reverse biasing the second rectifying diode 917 so no voltage passes to the intermediate node 930 and the capacitor 925.

During the negative cycle of the AC input, when the first switch 904 and the second switch 905 are turned off, the energy that was stored in the core 910 of the transformer 920 is now transferred into the windings on the secondary side of the power factor correction circuit. $V_{secondary2}$ builds up voltage until it is greater than $V_{intermediate}$ (the voltage at the intermediate node 930) by the forward drop of the rectifying diode 918, and then $V_{secondary2}$ transfers energy through rectifying diode 918 to the intermediate node 930 and the capacitor 925 to build up $V_{intermediate}$ to the desired regulating voltage. Due to the orientation of the first secondary winding, $V_{secondary1}$ is driven to a negative voltage when the second switch is turned off band thus no voltage moves across the first rectifying diode 916. The power factor correction circuit 900 also results in the cancellation of high frequency common mode noise generated by the high frequency switching of the first switch 904 and the second switch 905. As discussed above, the first primary winding 906 is capacitively coupled to the first secondary winding 912 and the second primary winding 908 is capacitively coupled to the second secondary winding 914. If both the first switch 904 and the second switch 905 are turned on, the voltage across the first capacitive coupling (the first primary winding 906 and the first secondary winding 912) and the voltage across the second capacitive coupling (the second primary winding 908 and the second secondary winding 914) are going to be equal in amplitude. The voltages across the capacitive couplings are going to be equal in amplitude, but opposite in phase. In other words they are going to be going in opposite directions. The voltage across the first capacitive coupling is, for example, $+200$ volts with respect to the reference ground; while the voltage across the second capacitive coupling is, for example, $-200$ volts. Thus, perfect high frequency common noise generation results. In other words you have a capacitor divider where the net sum energy is zero. Illustratively, during the negative cycle of the AC input, a voltage across the capacitor 942 may be $+100$ volts which is applied across the second terminal and the first terminal of the second secondary winding 914. Also, during the negative cycle of the AC input, a voltage across capacitor 940 may be $-100$ volts, which is applied across the first terminal and the second terminal of the first secondary winding 912. In this example, the voltages cancel each other out resulting in common mode noise cancellation.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A power factor correction circuit, comprising:
   a first primary winding and a second primary winding of an isolation transformer to receive an AC voltage and an AC current,
   a first switch coupled to the first winding and a second switch coupled to the second winding to draw current through the first primary winding and the second primary winding when the first switch and the second switch are turned on;
   a control circuit to drive the first switch and the second switch to generate a current waveform for the AC current in accordance with power factor correction requirements;
   a first secondary winding and a second secondary winding of the isolation transformer to receive, from the first primary winding and the secondary primary winding, an induced AC voltage and an induced AC current when the first switch and the second switch are turned off; and
   a rectification circuit on a secondary side of the isolation transformer to rectify the induced AC voltage and the induced AC current.

2. The power factor correction circuit of claim 1, wherein the first primary winding and the second primary winding are physically separate from each other.

3. The power factor correction circuit of claim 2, wherein a terminal of the first secondary winding and a terminal the second secondary winding are coupled to ground and this results in noise cancellation of the high-frequency common-mode noise generated by high-frequency switching of the first switch and the second switch.

4. The power factor correction circuit of claim 1, wherein the control circuit is configured to turn on the first switch and the second switch simultaneously.

5. The power factor correction circuit of claim 1, wherein during a positive cycle of the AC input, the first switch is turned on and off by the control circuit and the second switch is continuously turned on by the control circuit.

6. The power factor correction circuit of claim 1, wherein the rectification circuit is a first rectification diode and a second rectification diode.

7. The power factor correction circuit of claim 1, wherein the rectification circuit is a first field effect transistor (FET) and a second FET.

8. The power factor correction circuit of claim 1, wherein the power factor control circuit during a positive cycle of the AC input creates a clipped current waveform for the AC current if the control circuit is configured with a clipping threshold value and a value of a current in the first primary winding is above the clipping threshold value.

9. The power factor correction circuit of claim 1, wherein the power factor control circuit, during a negative cycle of the AC input, creates a clipped current waveform if the power factor control circuit is configured with a clipping threshold value and a value of the current in the second primary winding is above the clipping threshold value.

10. The circuit of claim 1, wherein the isolation transformer includes utilization of planar magnetics.

11. The circuit of claim 1, wherein the isolation transformer includes utilization of solid or stranded wire.

12. A method of providing isolation, power factor correction, and rectification, comprising:

receiving an AC voltage and an AC current at a first primary winding and a secondary winding of an isolation transformer;

generating a current waveform for the AC current in accordance with power factor correction requirements utilizing the first primary winding, the second primary winding, a first switch, a second switch, and a power factor control circuit;

generating a second intermediate voltage and an induced current on a secondary side of the isolation transformer when the first switch and the second switch are turned off by the power factor control circuit; and rectifying the second intermediate voltage and the induced current to create a rectified intermediate voltage and a rectified secondary current.

13. The method of claim 12, wherein the rectifying of the second intermediate voltage and the induced current occurs utilizing a pair of rectification diodes.

14. The method of claim 12, wherein the rectifying of the second intermediate voltage and the induced current occurs utilizing a pair of field effect transistors.

15. The method of claim 12, wherein the current waveform is clipped utilizing the control circuit if an inductor current has a larger value than a threshold value.

16. The method of claim 12, further including generating high frequency common mode noise, which is capacitively coupled from the first primary winding to the first secondary winding and from the second primary winding to the second primary winding, and canceling the high frequency common mode noise on a secondary side of the isolation transformer because of the configuration of the first secondary winding and the second secondary winding.

17. The method of claim 12, wherein the current waveform is substantially sinusoidal in shape.

* * * * *